United States Patent [19]

Clark et al.

[11] Patent Number: 5,564,742
[45] Date of Patent: Oct. 15, 1996

[54] AIRBAG INFLATOR PERFORMANCE TELLTALE

[75] Inventors: Randall J. Clark, Pleasant View; John R. Seamons, Tremonton, both of Utah

[73] Assignee: Morton International, Inc., Chicago, Ill.

[21] Appl. No.: 504,751

[22] Filed: Jul. 20, 1995

[51] Int. Cl.⁶ .................................................. B60R 21/26
[52] U.S. Cl. .................................. 280/740; 280/741
[58] Field of Search ............................ 280/740, 741, 280/742, 736, 737; 222/3, 5; 102/530, 531; 422/164, 165, 166

[56] References Cited

U.S. PATENT DOCUMENTS

| | | | |
|---|---|---|---|
| Re. 30,327 | 7/1980 | Damon | 280/740 |
| 3,960,390 | 6/1976 | Goetz | 280/737 |
| 3,984,126 | 10/1976 | Goetz et al. | 280/740 |
| 4,068,862 | 1/1978 | Ishi et al. | 280/740 |
| 4,178,017 | 12/1979 | Ishi et al. | 280/740 |
| 4,278,638 | 7/1981 | Nilsson et al. | 280/736 |
| 5,516,147 | 5/1996 | Clark et al. | 280/741 |

*Primary Examiner*—Anne Marie Boehler
*Assistant Examiner*—Peter C. English
*Attorney, Agent, or Firm*—George W. Rauchfuss, Jr.; Gerald K. White

[57] ABSTRACT

An inelastically deformable member is positioned in the path of gases leaving an inflator and passing to an airbag. The pressure of the gas causes the member to deform and measurement of the deformation discloses the adequacy of the inflator performance. The same deformable member may also function as a gas diffuser.

15 Claims, 2 Drawing Sheets

1

AIRBAG INFLATOR PERFORMANCE TELLTALE

TECHNICAL FIELD

This invention relates to a method and means for assessing the performance of airbag inflators. More particularly, it pertains to method and apparatus for post-inflation measurement of the airbag inflator's performance.

BACKGROUND ART

Automotive airbag installations normally employ an inflator to produce the gases required to inflate an airbag. Such inflators commonly employ a pyrotechnic material which either acts alone to produce the gas or serves to release stored supplemental gas. Inflators of the latter type are known as "hybrid" inflators. One example of a hybrid inflator will be found in co-pending U.S. patent application Ser. No. 08/321,786 filed Oct. 12, 1994 by R. J. Clark et al. for "Stamped Metal Toroidal Hybrid Gas Generator with Sliding Piston" and assigned to the same assignee as the present invention. The disclosure of that application is incorporated by reference herein.

After the occurrence of an accident and subsequent airbag deployment, it would be desirable to ascertain whether or not the inflator performed adequately. By "adequately" is meant whether the inflator functioned to provide gas at a sufficiently high pressure, i.e. at least at a predetermined minimum operating pressure, to inflate the airbag within the necessary time period. If, for example, a hybrid type inflator had a slow leak permitting the escape of the pressurized inert gas stored therein, the pressure produced by the pyrotechnic material alone or in combination with the remaining stored gas might be inadequate to reach the predetermined minimum operating pressure. However, this would not be readily ascertainable merely from a post-inflation inspection of the inflator.

Accordingly, it is a primary object of the present invention to provide a method and apparatus for readily determining, by a post-inflation inspection, if the inflator functioned properly by producing inflation gases at or above a predetermined minimum operating pressure. It is also an object of the invention to provide such a post-inflation inspection that does not require dissecting or disassembling the fired inflator and requires no electronics or electrical circuitry. A still further object of the invention is to provide for such post-inflation inspection without requiring any additional components. Other objects, features, and advantages will become apparent from the following description and appended claims.

SUMMARY OF THE INVENTION

This invention comprises a telltale in the form of an inelastic deformable member which is positioned in the path of gas exiting from an inflator to deploy an airbag. Observing and/or measuring the deformation of the member after airbag deployment provides information about the gas pressure developed and, as a result, the adequacy of inflator performance. The telltale is preferably a deformable diffuser secured to the inflator.

DETAILED DESCRIPTION OF THE INVENTION

Figure 1:
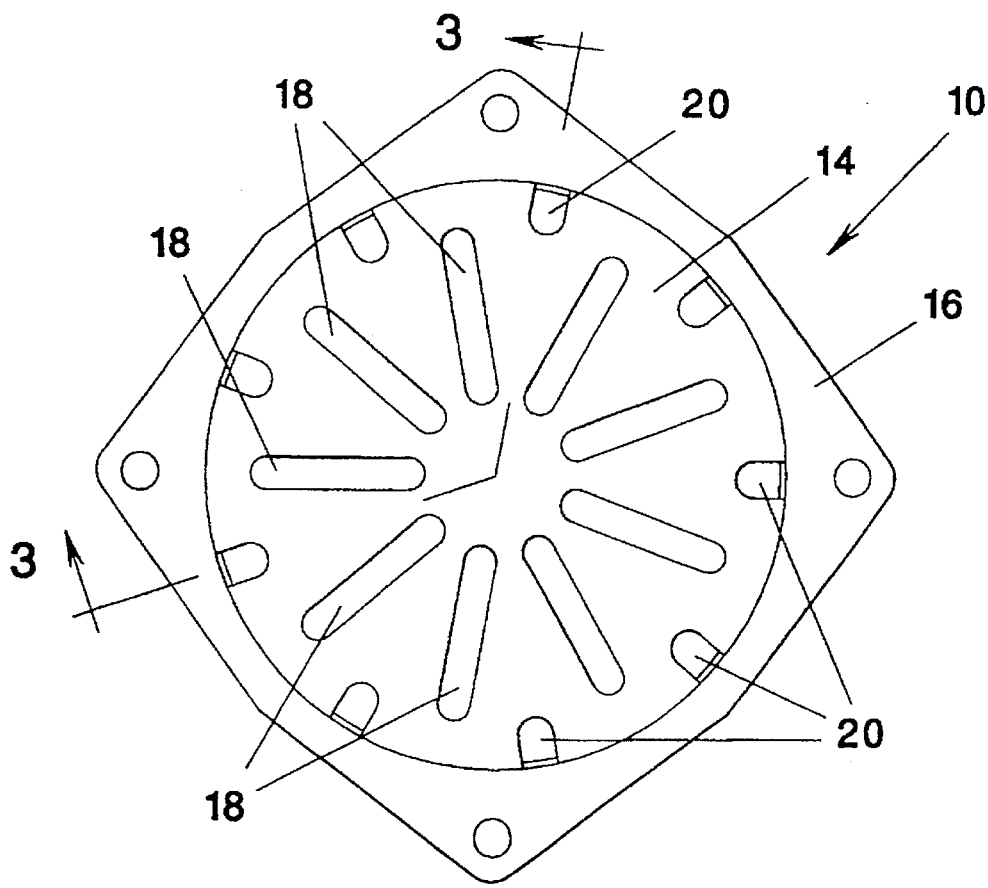
FIG. 1 is a plan view of a telltale in accordance with the present invention.
Figure 2:
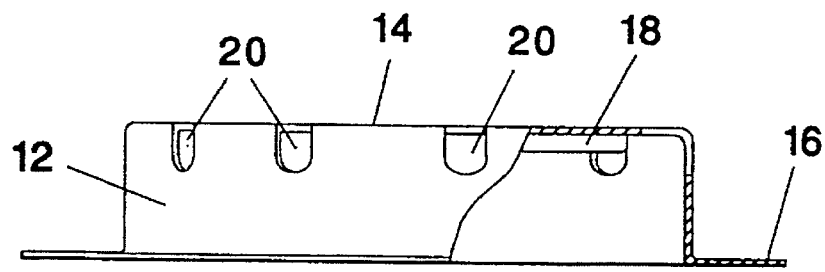
FIG. 2 is an elevational view of the telltale of FIG. 1, partially broken away to illustrate its internal construction.

FIGS. 1 and 2 illustrate a telltale 10 in accordance with the present invention which is also adapted to function as a diffuser during airbag inflation. It is substantially cup-shaped having a cylindrical sidewall 12 and a substantially planar base or top 14. (It will be understood that orientation is not critical and the word "top" is relative only and used in the context of the accompanying drawings.) In the particular embodiment illustrated, the sidewall 12 is surrounded by a radially outwardly projecting mounting flange 16. Although flange 16 is shown located at the bottom edge of sidewall 12, it will be appreciated that the flange may be located at any suitable location along the sidewall.

It is important, in order to function as a telltale that it be standardized and reproducible. This is because the telltale is designed to deform by a predetermined amount when the inflator produces gas at a preselected minimum operating pressure. The physical characteristics will vary from one inflator to another. It will be appreciated that the deformation of the telltale is dependent, at least in part, upon the thickness, material strength and geometry of the deformable portion of the telltale and also the mass flow of inflation gases from the inflator. However, all similar telltales provided for a given model inflator should deform by substantially similar amounts at a given inflation pressure.

In addition to serving as a telltale, this unit also operates as a diffuser. To this end the edge common to the sidewall 12 and the top 14 defines a plurality of gas diffusing openings 20. There are nine such openings, positioned intermediate stiffening ribs 18. In the specifically described embodiment, each of the gas diffusing openings extends inwardly into the top 14 a distance of 8.2 mm and downwardly along the sidewall a distance of 10.4 mm. The height of the sidewall in this embodiment is 23.8 mm. The stiffening ribs 18 are generally arranged on the top 14 of the telltale in such a manner that the force of the exiting inflation gases causes the top to deform generally hemispherically into a dome in a readily measurable and observable manner. A preferred arrangement of such stiffening ribs 18 is a radially projecting circular array of depressions in top 14.

Figure 3:
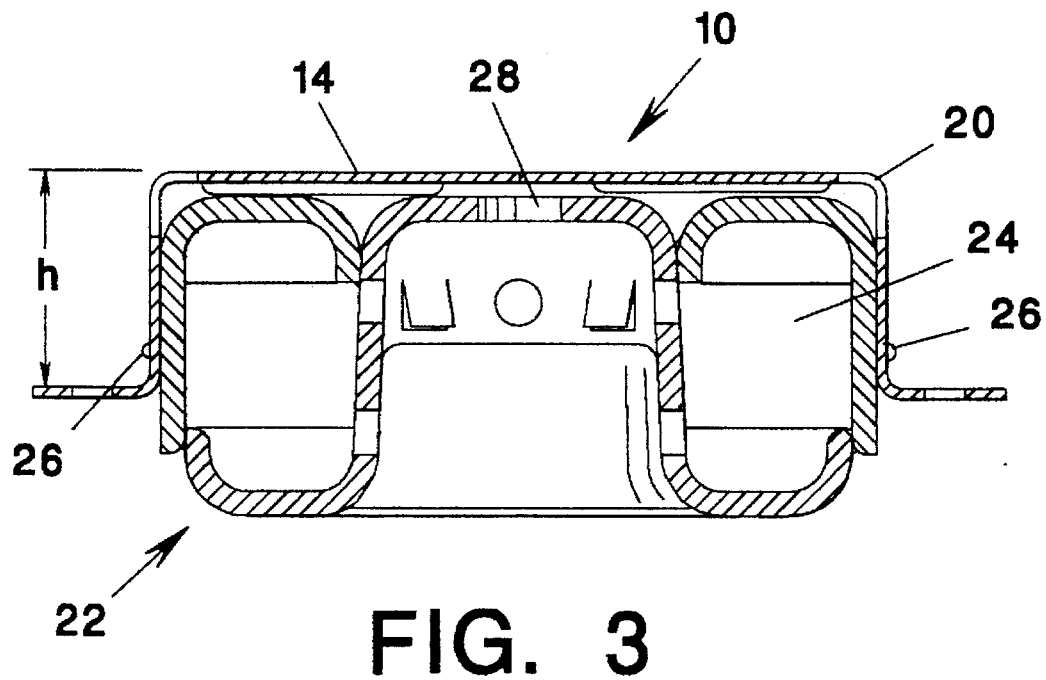
FIG. 3 is a cross-section taken substantially along the line 3—3 of FIG. 1 illustrating the telltale mounted on a hybrid inflator.
Figure 4:
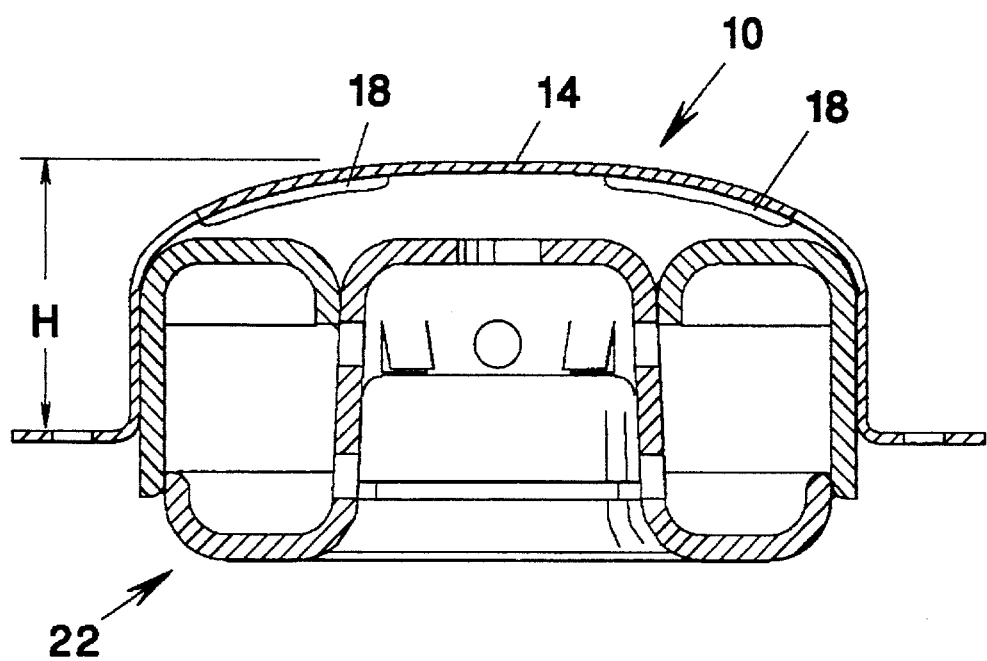
FIG. 4 is an illustration similar to FIG. 3 showing the measurable deformation of the telltale after inflation.

FIG. 3 illustrates the telltale 10 of this invention mounted on a hybrid inflator 22. This inflator is generally of the type described in the above-referenced co-pending patent application Ser. No. 08/321,786. It includes a toroidal inert gas chamber 24. The telltale 10 fits over the inflator 22 as illustrated and is securely fastened thereto by means of an encircling weld 26. The operation of the inflator need not be further described as it does not form a feature of this invention. Suffice it to say, however, that the inflation gases produced exit from a central gas discharge opening 28 to pass through the gas diffusing openings 20 and into an airbag, not shown. Accordingly, the telltale which, being of steel is inelastically deformable, is located directly in the path of the exiting gas. As a result, the pressure of the gas deforms the top 14 into the dome shape illustrated in FIG. 4. The height of the telltale increases from its initial height h shown in FIG. 3 to a new height H shown in FIG. 4. A comparison of these two measurements will indicate whether sufficient pressure was developed.

In one actual embodiment of the present invention the telltale was stamped from steel (ASTM A715 GR 50) having a thickness of 1.27±0.05 mm. The internal diameter of the sidewall 12 is dependent upon the inflator with which it is used but in one instance was 101.26+0.06 (−0.00) mm. Stamped into the upper surface of the top 14 is a circular array of nine stiffening ribs 18 which extend downwardly from the inner surface of the top 14. The depth of the metal depression is 1.27 mm. In the specifically described embodiment, the length of each rib is 30.80 mm.

In the specific embodiment described above, for example, the average increase in height during satisfactory inflation, i.e. the inflation gases producing a gas pressure of at least a predetermined minimum operating pressure, amounted to approximately 26%. A value significantly less than this amount would indicate an inadequate response of the inflator in a collision.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. In a motor vehicle occupant restraint system comprising an airbag inflator having at least one gas discharge opening for providing inflation gases to an inflatable airbag, apparatus for determining if a minimum predetermined operating pressure is developed by the inflation gases from said inflator during deployment thereof, said apparatus comprising:

an inelastically deformable member secured to the inflator and positioned between the at least one gas discharge opening and said inflatable airbag, said deformable member comprising a substantially planar region having an array of radial stiffening ribs defined in said substantially planar region, said deformable member having the property of the substantially planar region deforming by a predetermined amount into a generally hemispheric dome only upon attainment by said inflation gases of a predetermined minimum operating pressure.

2. The apparatus of claim 1 wherein said deformable member is a diffuser.

3. The apparatus of claim 2 wherein said inflator is substantially cylindrical and said diffuser is a substantially cup-shaped diffuser having a cylindrical sidewall encircling and rigidly secured to the inflator.

4. The apparatus of claim 3 wherein said diffuser defines gas diffusing openings therein on an edge common to the sidewall and the substantially planar region.

5. The apparatus of claim 4 wherein said diffuser is metal.

6. The apparatus according to claim 5 wherein the deformation by a predetermined amount of the deformable planar region of the diffuser is dependent, at least in part, upon thickness, material strength and geometry of the deformable planar region and mass flow of inflation gases from the inflator.

7. Apparatus for confirming whether minimum predetermined operating pressure is developed during deployment by a motor vehicle airbag inflator having at least one gas discharge opening therein, which apparatus comprises:

an inelastic substantially cup-shaped diffuser having a substantially planar base and a sidewall for encircling the at least one gas discharge opening of the inflator and being rigidly securable to the inflator, said diffuser defining gas diffusing openings therein;

an array of radial stiffening ribs formed in said planar base; and said substantially planar base being deformable into a generally hemispheric dome of predetermined height upon exposure to inflation gas at the minimum predetermined operating pressure from said at least one discharge opening.

8. The apparatus according to claim 7 wherein said cup-shaped diffuser is a metal diffuser.

9. The apparatus according to claim 8 wherein said planar base is essentially circular.

10. The apparatus according to claim 8 wherein the deformation of the deformable planar base of the diffuser is dependent, at least in part, upon thickness, material strength and geometry of the deformable planar base and mass flow of inflation gases from the inflator.

11. A method for confirming minimum predetermined operating pressure developed during deployment of an inflator of a motor vehicle airbag which comprises:

providing an inflator having at least one gas discharge opening for supplying inflation gases to an inflatable airbag, said inflator having an inelastically deformable member positioned in the path of inflation gases passing from said at least one gas discharge opening to the airbag, said deformable member having the property of deforming a predetermined amount only upon attainment by said inflation gases of a minimum predetermined operating pressure;

actuating the inflator to inflate the airbag and deform the deformable member; and measuring the deformation of the deformable member as an indication of the pressure produced by said inflation gases.

12. A method according to claim 11 wherein the inelastic deformable member is a metal diffuser which performs the additional step of diffusing the inflation gases passing from the at least one gas discharge opening to said airbag and said diffuser is deformed into a dome of predetermined height upon the exposure to inflation gases of the minimum predetermined operating pressure.

13. A method according to claim 12 wherein the deformation of the deformable metal diffuser is dependent, at least in part, upon thickness, material strength and geometry of the metal diffuser and mass flow of inflation gases from the inflator.

14. A method according to claim 12 wherein the metal diffuser is substantially cup-shaped and comprises a substantially planar region deforming into said dome and a cylindrical sidewall encircling and rigidly secured to the inflator, said substantially planar region having an array of stiffening ribs defined therein and the deformation is measured by measuring a height of the dome formed by the deformation of the metal diffuser upon the actuating of the inflator.

15. A method according to claim 14 wherein the array of stiffening ribs are defined as a generally circular array of radial ribs in the substantially planar region such that the substantially planar region deforms generally hemispherically into said dome.

* * * * *